United States Patent
Le Getty et al.

(10) Patent No.: US 9,360,154 B2
(45) Date of Patent: Jun. 7, 2016

(54) SYSTEMS AND APPARATUSES TO SUPPORT AN ELECTRONIC DEVICE

(71) Applicant: ZEROCHROMA, LLC, Sykesville, MD (US)

(72) Inventors: Brian E. Le Gette, Baltimore, MD (US); David Reeb, Sykesville, MD (US)

(73) Assignee: ZERO CHROMA, LLC, Sykesville, MD (US)

( * ) Notice: Subject to any disclaimer, the term of this patent is extended or adjusted under 35 U.S.C. 154(b) by 321 days.

(21) Appl. No.: 13/735,702

(22) Filed: Jan. 7, 2013

(65) Prior Publication Data
US 2014/0191095 A1 Jul. 10, 2014

(51) Int. Cl.
| | | |
|---|---|---|
| A47F 5/00 | (2006.01) | |
| F16M 13/00 | (2006.01) | |
| F16M 11/10 | (2006.01) | |
| F16M 11/20 | (2006.01) | |
| F16M 13/04 | (2006.01) | |

(52) U.S. Cl.
CPC ............... *F16M 13/00* (2013.01); *F16M 11/10* (2013.01); *F16M 11/2028* (2013.01); *F16M 13/04* (2013.01)

(58) Field of Classification Search
CPC ....... F16M 13/00; F16M 13/04; F16M 11/10; F16M 11/2028
USPC .............. 248/228.8, 229.17, 230.8, 444, 673, 248/676, 677, 309.1–313; 361/679.09, 361/679.58; 108/43; 220/752; 455/575.1
See application file for complete search history.

(56) References Cited

U.S. PATENT DOCUMENTS

| | | | |
|---|---|---|---|
| 6,016,248 A | 1/2000 | Anzai et al. | |
| 6,062,518 A * | 5/2000 | Etue .......................... | 248/231.21 |
| 6,266,240 B1 | 7/2001 | Urban et al. | |
| 7,387,209 B2 | 6/2008 | Ko et al. | |
| 8,006,944 B2 * | 8/2011 | Ueda et al. .................. | 248/74.3 |
| 8,132,764 B2 * | 3/2012 | Kuipers ...................... | 248/74.3 |
| 8,264,310 B2 | 9/2012 | Lauder et al. | |
| 8,382,059 B2 | 2/2013 | Le Gette et al. | |
| 8,428,664 B1 | 4/2013 | Wyers | |
| 8,740,270 B1 * | 6/2014 | Mizell et al. .................... | 294/25 |
| 2004/0113036 A1 | 6/2004 | Gilbert | |
| 2005/0205737 A1 * | 9/2005 | Phelps et al. ............... | 248/309.1 |
| 2009/0140113 A1 * | 6/2009 | Carnevali ................ | 248/223.41 |
| 2010/0072334 A1 | 3/2010 | Le Gette et al. | |
| 2011/0127392 A1 * | 6/2011 | Carter .......................... | 248/121 |

(Continued)

OTHER PUBLICATIONS

Flaminio, Mike, "Speck CandyShell Wrap case/stand for iPad (Video Review)," Feb. 9, 2011, available at http://www.insanely-great.com/news.php?id=11617.

(Continued)

*Primary Examiner* — Gwendolyn Baxter
(74) *Attorney, Agent, or Firm* — Oblon, McClelland, Maier & Neustadt, L.L.P

(57) ABSTRACT

Mounting apparatuses, electronic device holders, and components of electronic device holders are shown and described herein. A mounting apparatus is removably connected to an object and the electronic device holder. The electronic device holder is configured to hold an electronic device and has one or more of an adaptor, a movable stand, and one or more portions of a backside thereof that are either clear or removed. The adaptor is removable from the electronic device holder for removal and replacement thereof with one or more additional, different adaptors.

23 Claims, 19 Drawing Sheets

(56) References Cited

U.S. PATENT DOCUMENTS

| | | | |
|---|---|---|---|
| 2011/0279959 A1* | 11/2011 | Lopez | 361/679.03 |
| 2012/0111881 A1 | 5/2012 | Gaddis, II et al. | |
| 2012/0199501 A1 | 8/2012 | Le Gette et al. | |
| 2012/0275094 A1 | 11/2012 | Zhou et al. | |
| 2012/0287565 A1 | 11/2012 | Bennett, Jr. | |
| 2013/0043778 A1 | 2/2013 | Bennett, Jr. | |
| 2013/0069381 A1* | 3/2013 | Sakamoto | 294/142 |
| 2013/0134291 A1 | 5/2013 | Le Gette et al. | |

OTHER PUBLICATIONS

Horwitz, Jeremy, "Speck CandyShell Wrap for iPad2," Aug. 8, 2011, available at http://www.ilounge.com/index.php/reviews/entry/speck-candyshell-wrap-for-ipad-2/.

International Search Report and Written Opinion issued May 6, 2015 in PCT/US2015/010301 (with Search History).

* cited by examiner

SYSTEMS AND APPARATUSES TO SUPPORT AN ELECTRONIC DEVICE

SUMMARY OF THE INVENTION

The present invention relates generally to systems, apparatuses, and methods for supporting electronic devices. Embodiments of the present invention involve mounting apparatuses, electronic device cases or holders, and components of electronic device cases or holders. Non-limiting examples of electronic devices supportable by embodiments of the present invention include cell phones, smartphones, personal digital assistants (PDAs), portable video/music players, electronic tablets, GPS displays, and other portable or handheld electronic devices. Further, the electronic devices may have a frontal LCD, OLED, touch screen, or other display, and the electronic device cases or holders according to one or more embodiments of the present invention can provide unobstructed access to the entire frontal screen or display.

In one or more embodiments of the present invention, a mounting apparatus is removably attachable or coupleable to an object, such as a portion of a person (e.g., an arm, a head, etc.), a portion of a vehicle (e.g., a portion of a dash, a fold-down blind, a back of a headrest, a bicycle handle bar, etc.), an accessory (e.g., a belt), or an article of clothing (e.g., pants). An electronic device holder according to an embodiment of the present invention is removably attachable to the mounting apparatus. A movable stand of the electronic device holder can be the means by which the electronic device holder is removably attached to the mounting apparatus. Optionally, an orientation of the electronic device holder relative to the mounting apparatus may be changed. An electronic device can be removably attached to the electronic device holder. Optionally, the electronic device holder may be attached to the mounting apparatus with the electronic device held or encased therein. Thus, the mounting apparatus can be used, worn, carried, or otherwise transported, along with a corresponding electronic device held or encased by the electronic device holder mounted to the mounting apparatus.

In one or more embodiments of the present invention an electronic device holder has a movable stand portion, which may be moveable in more than one direction, such as extendable and optionally rotatable. Optionally, the stand may have a flexible portion and may be detachable from the electronic device holder. Generally speaking, a portion or portions of the electronic device holder may be coupled to a corresponding mounting apparatus and a portion or portions of the electronic device holder are movable relative to the mounting apparatus, while the portion or portions of the electronic device holder remain stationary, coupled to the mounting apparatus.

According to an embodiment of the present invention, the electronic device holder can have a cover to enclose a front, viewing side of an electronic device enclosed or held by the electronic device holder. Optionally, the cover may be detachable from the electronic device holder, for example, via an adapter that itself may be removable from the electronic device holder. Also, optionally, the cover may be removable from the adapter and replaced with another component compatible with the adaptor, such as a keyboard connection portion. Additionally, according to an embodiment of the present invention, the cover may be foldable to act as the movable stand or another stand for the electronic device holder. Optionally, the cover may be connectable to a mounting apparatus (e.g., a strap) for removably attaching to an object, such as a back portion of a headrest of an automobile.

According to an embodiment of the present invention, a system to support an electronic device comprises an electronic device holder to hold the electronic device; and a movable stand arranged on a back side of the electronic device holder, the movable stand being configured to be releasably coupled to a mount.

An embodiment of the present invention also includes an electronic device holder to hold an electronic device that comprises: a body including a coupling mechanism on a front face thereof to receive and hold the electronic device; and an adaptor removably coupled to the body.

Also, an embodiment of the present invention includes a system to support an electronic device that comprises an electronic device holder to hold the electronic device; and a movable stand arranged on a back side of the electronic device holder, the movable stand being configured to be releasably coupled to a mount and movable in at least three different directions, two of the three directions being outward from the electronic device holder and inward toward the electronic device holder.

In addition, in another embodiment of the present invention, a system to support an electronic device comprises an electronic device holder to hold the electronic device; and a movable stand arranged on a back side of the electronic device holder, the movable stand being configured to be releasably coupled to a mount and movable in at least three different directions, two of the three directions being outward from the electronic device holder and inward toward the electronic device holder, wherein the movable stand is configured to allow movement of the electronic device holder relative to the mount when the movable stand is releasably coupled to the mount.

In another embodiment, an electronic device holder to hold an electronic device comprises a body including a back side and a front side having a coupling mechanism to receive and hold a first portion of the electronic device; and an adaptor removably coupled to a side portion of the body, the adaptor being configured to receive and hold a second portion of the electronic device.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF THE INVENTION

The description set forth below in connection with the appended drawings is intended as a description of various embodiments of the invention and is not necessarily intended to represent the only embodiments in which the invention may be practiced. In certain instances, the description includes specific details for the purpose of providing an understanding of the invention. However, it will be apparent to those skilled in the art that the invention may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Additionally, it must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more."

As noted above, embodiments of the present invention are directed to systems, apparatuses, and methods for supporting electronic devices. One or more embodiments of the present invention involve mounting apparatuses, electronic device cases or holders, and components of electronic device cases or holders.

Figure 1:
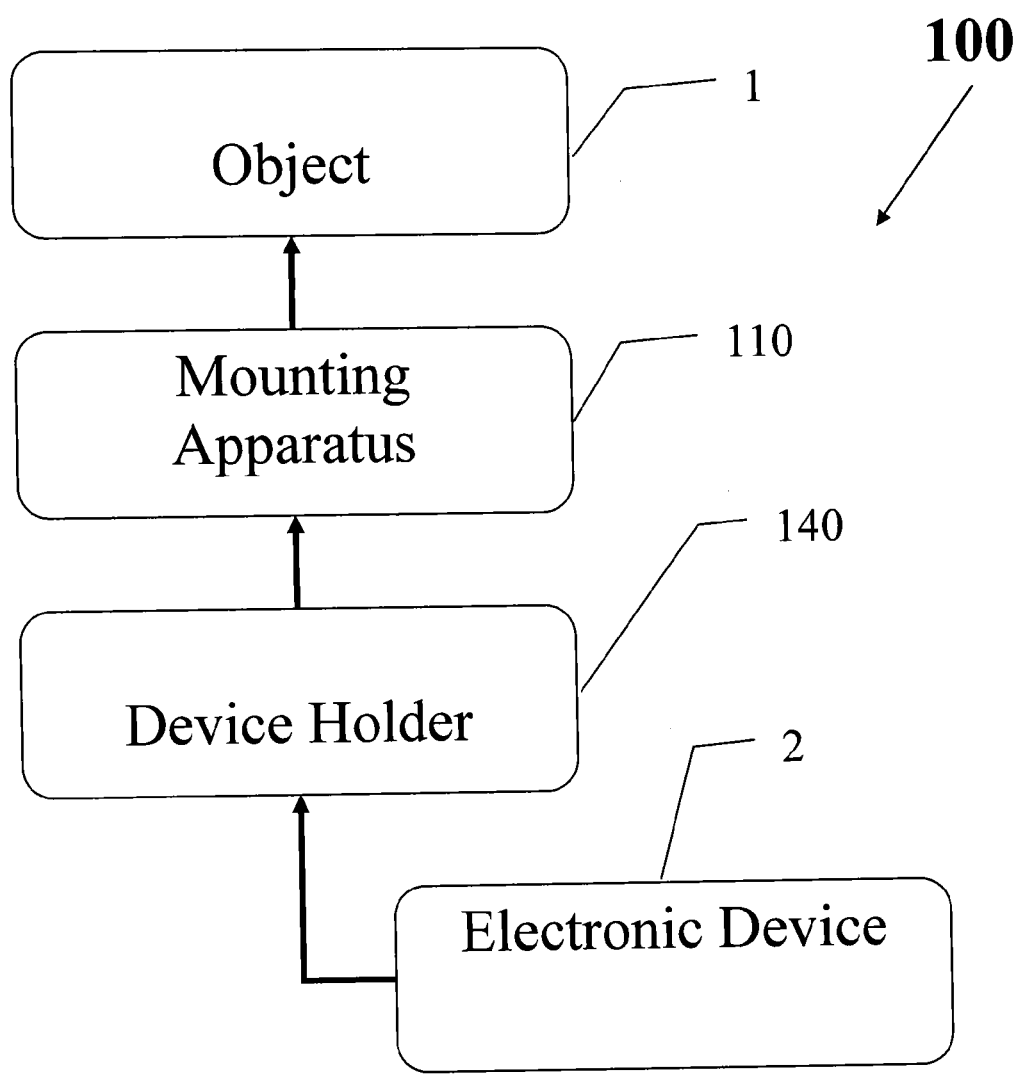
FIG. 1 is a block diagram of system for supporting an electronic device according to an embodiment of the present invention.

FIG. 1 is a block diagram of support system 100 for an electronic device according to an embodiment of the present invention.

System 100 can include a mounting apparatus 110 and an electronic device holder 140. The mounting apparatus 110 is removably attachable or coupleable to an object 1, such as a portion of a person (e.g., an arm, a head, etc.), a portion of a vehicle (e.g., a portion of a dash, a fold-down blind, a back of a headrest, a bicycle handle bar, etc.), an accessory (e.g., a belt), or an article of clothing (e.g., pants). The electronic device holder 140 is removably attachable or mountable to the mounting apparatus 110 via a mounting portion of the mounting apparatus 110. An electronic device 2 can be removably attached or coupled to the electronic device holder 140 via a coupling mechanism included on an open or front face or side of the electronic device holder 140. Optionally or alternatively, the electronic device holder 140 may be removably attachable directly to the object 1, without providing the mounting apparatus 110 for the system 100 or without the mounting apparatus 110 being attached to the object 1.

Figure 2:
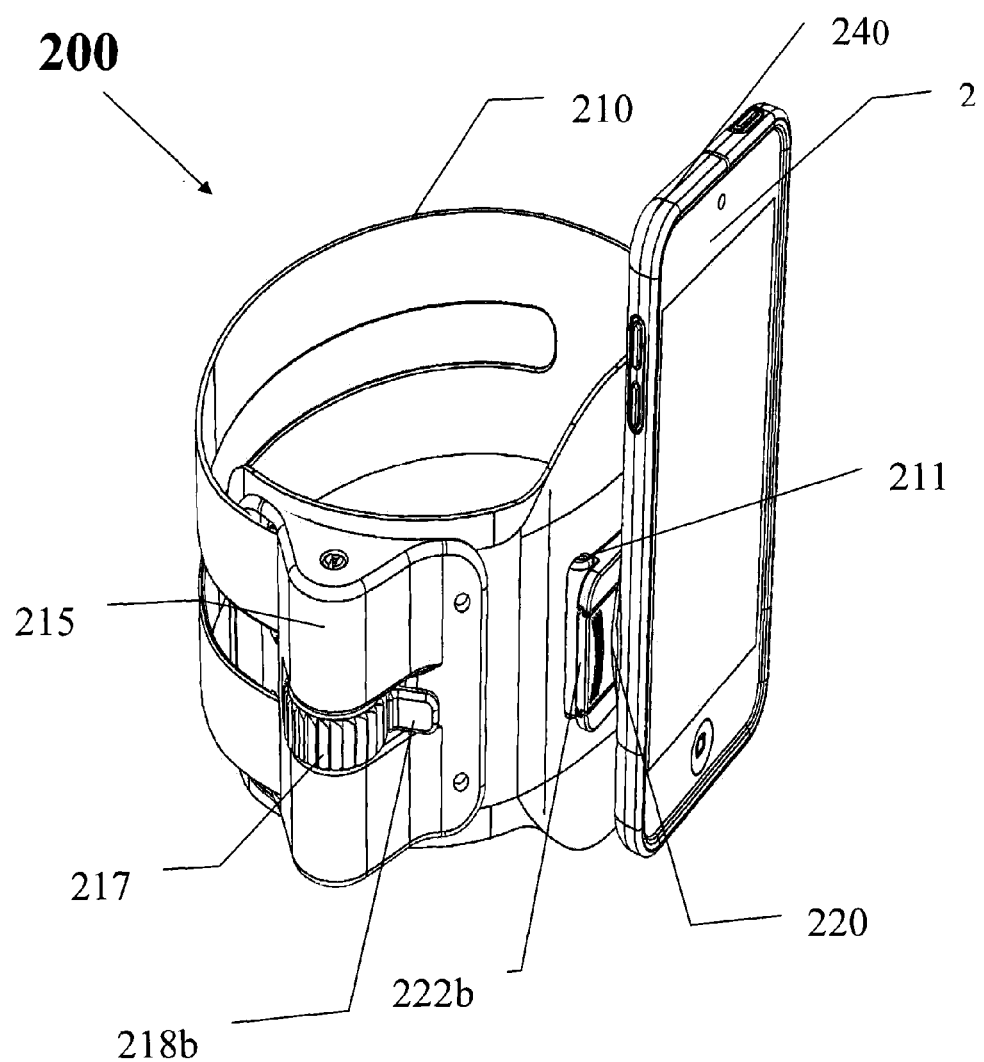
FIG. 2 is a perspective view of a system for supporting an electronic device according to an embodiment of the present invention.
Figure 3A:
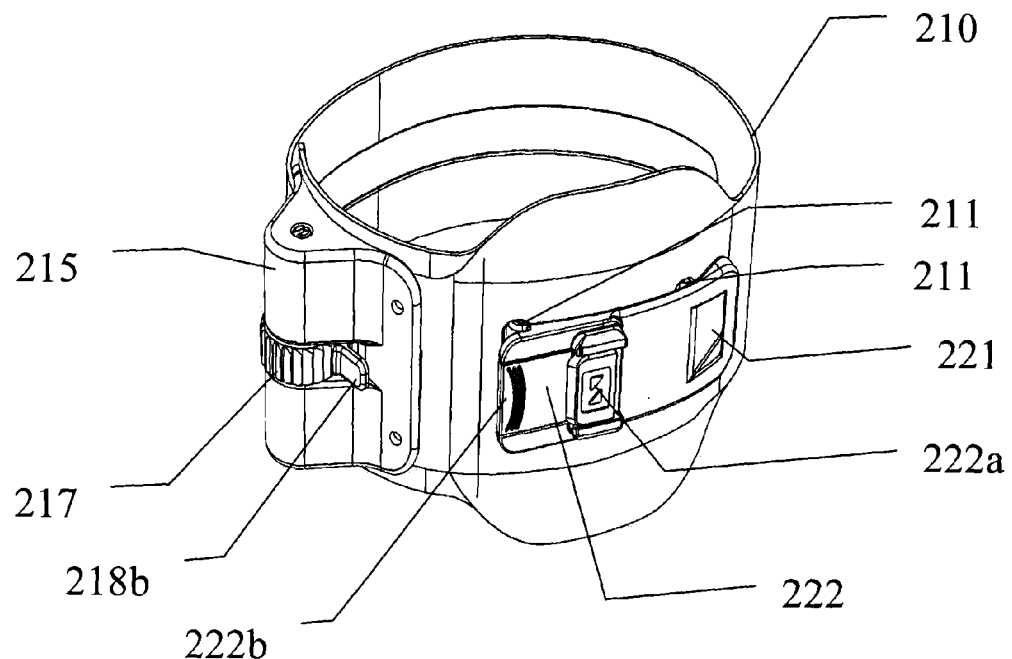
FIG. 3A is a perspective view of an example of a mounting apparatus of the system of FIG. 2.
Figure 3B:
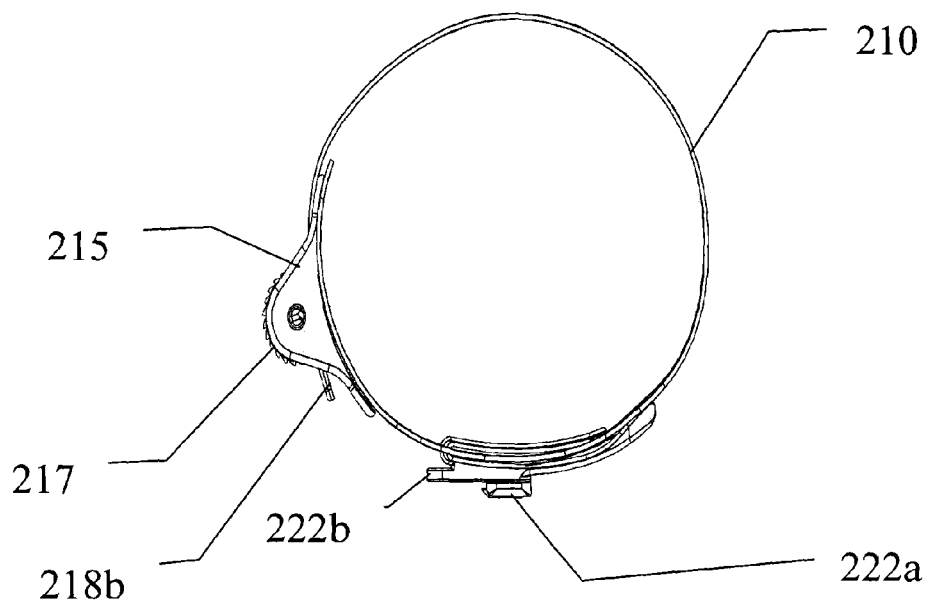
FIG. 3B is an overhead view of the mounting apparatus of FIG. 3A.
Figure 3C:
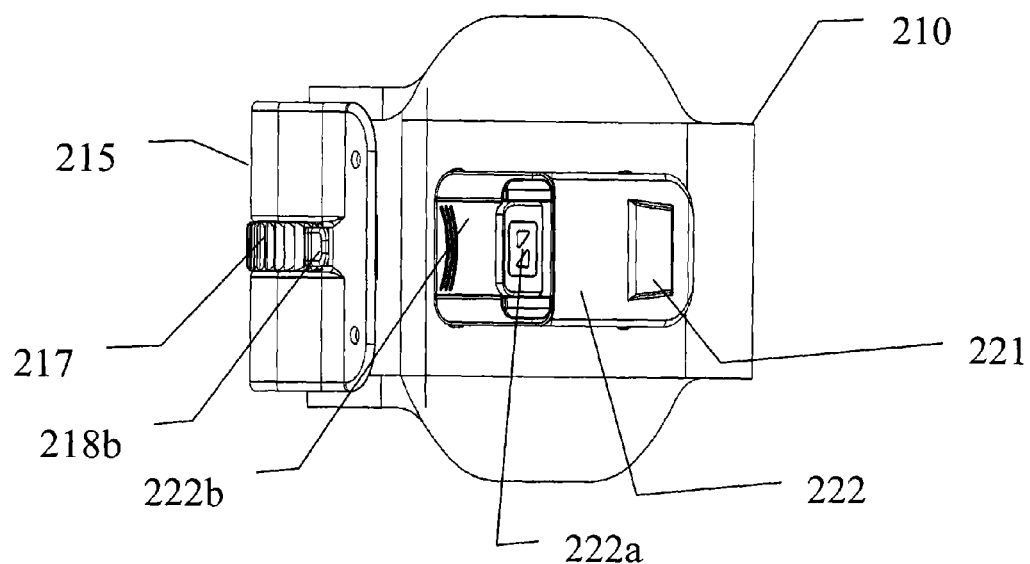
FIG. 3C is a front view of the mounting apparatus of FIG. 3A.
Figure 3D:
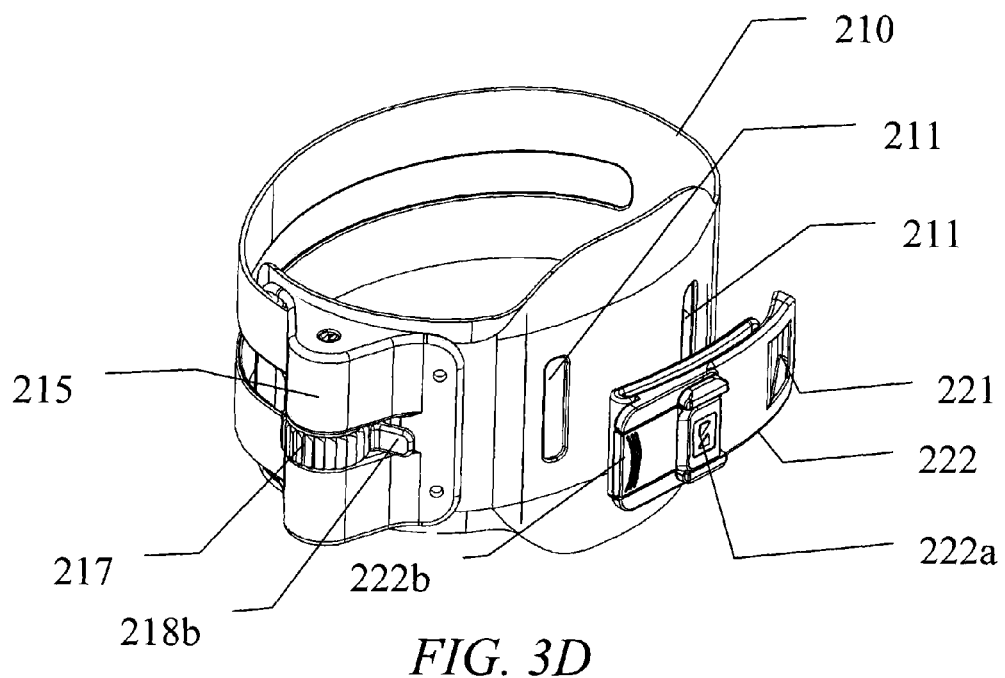
FIG. 3D is a perspective exploded view of the mounting apparatus of FIG. 3A.
Figure 3E:
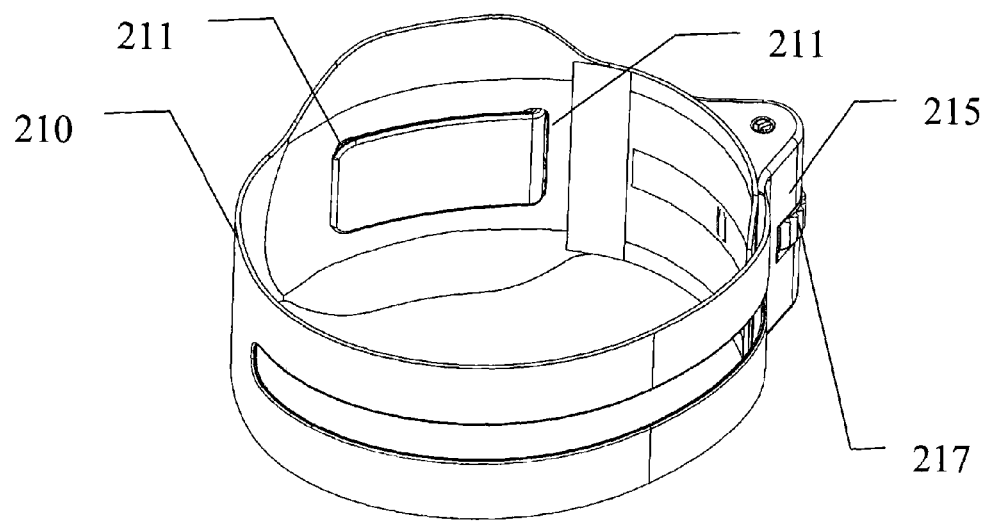
FIG. 3E is a rear perspective view of the mounting apparatus of FIG. 3A.
Figure 3F:
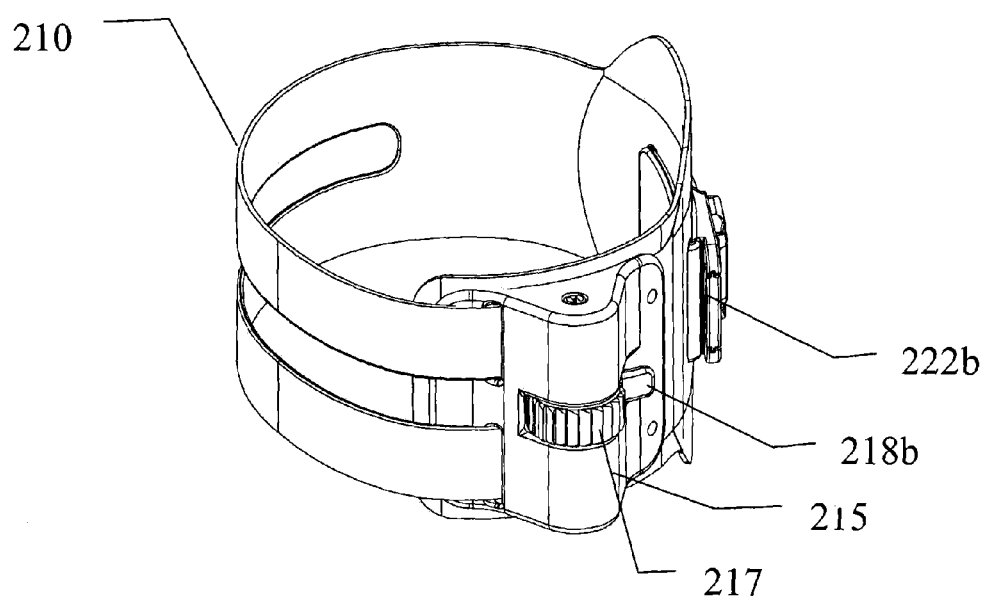
FIG. 3F is a side e perspective view of the mounting apparatus of FIG. 3A.
Figure 4A:
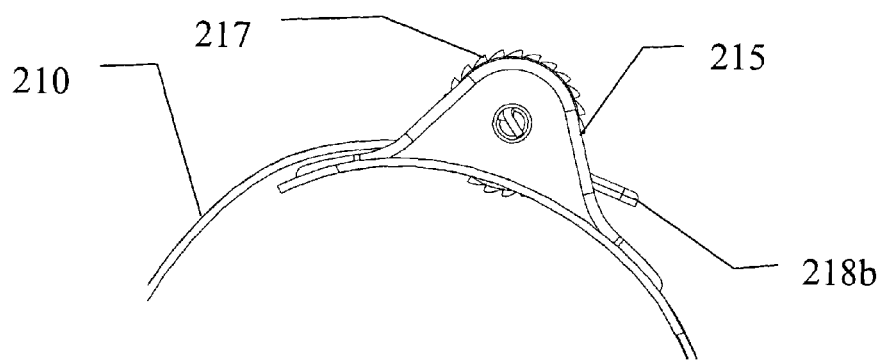
FIG. 4A is a side view of a portion of an adjustment mechanism of the mounting apparatus of FIG. 3A.
Figure 4B:
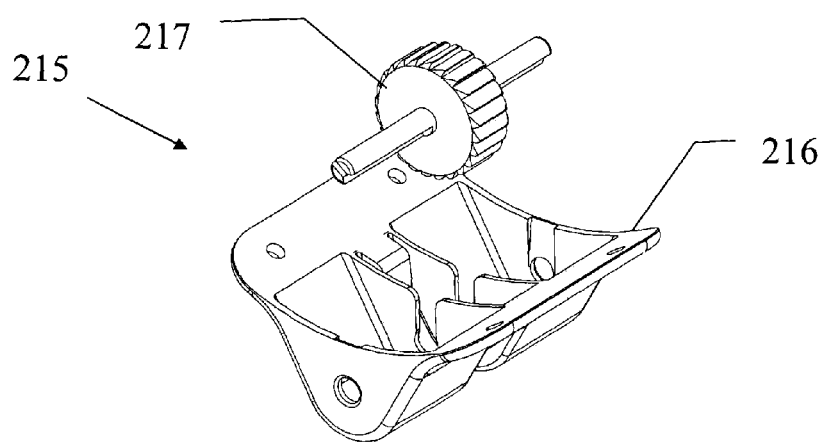
FIG. 4B is a disassembled view of select components of the adjustment mechanism of FIG. 4A.
Figure 4C:
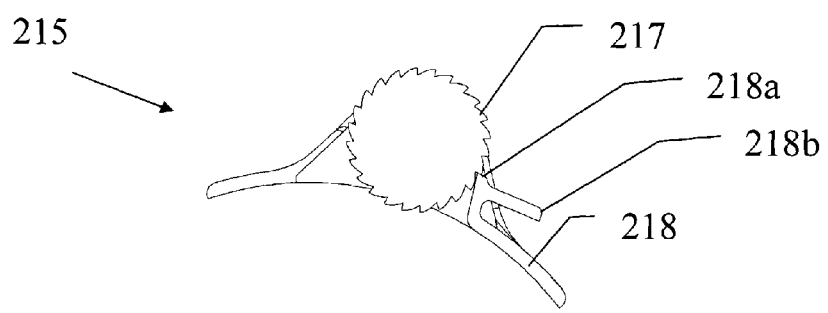
FIG. 4C is a cross-sectional diagrammatic representation of the adjustment mechanism of FIG. 4A.
Figure 5A:
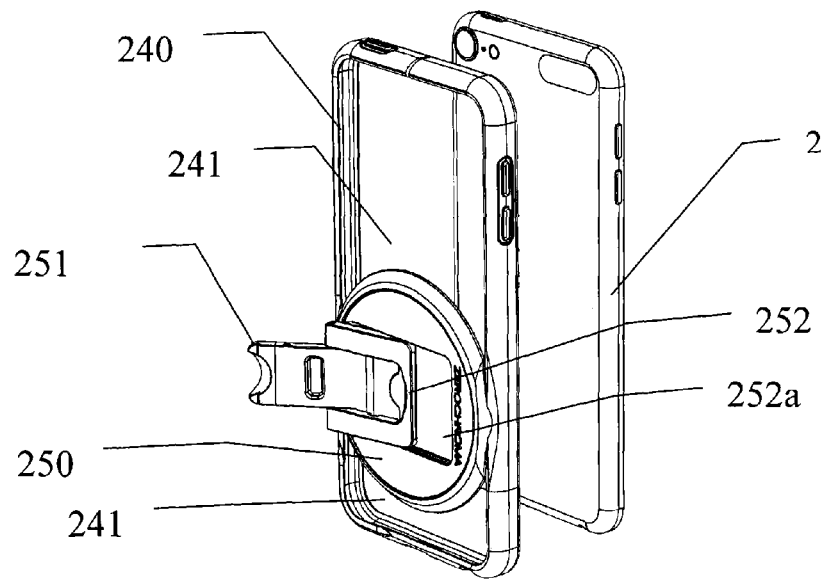
FIG. 5A shows an exploded view of an electronic device holder according to an embodiment of the present invention with an electronic device.
Figure 5B:
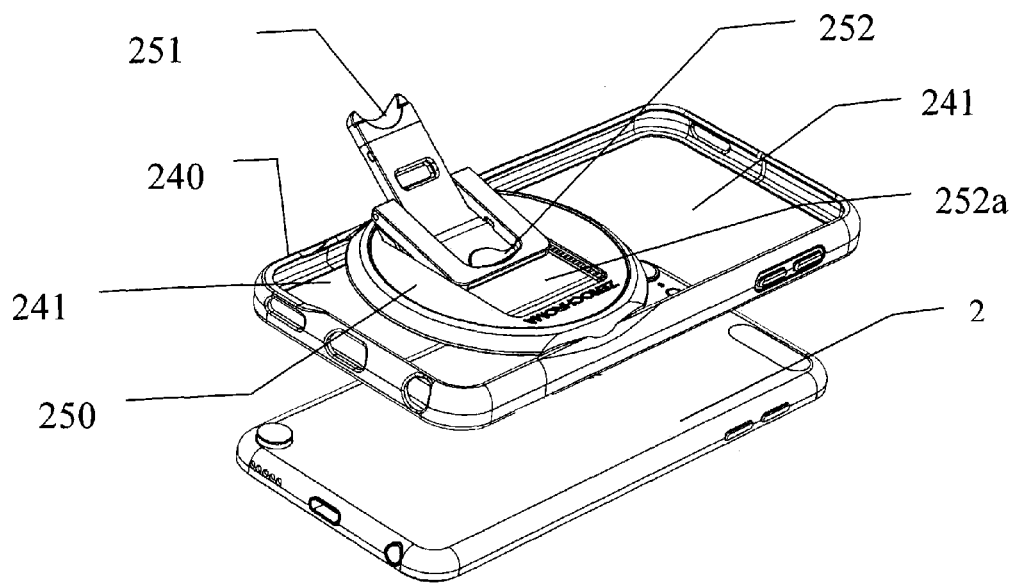
FIG. 5B is another exploded view of the electronic device and the electronic device holder of FIG. 5A.
Figure 5C:
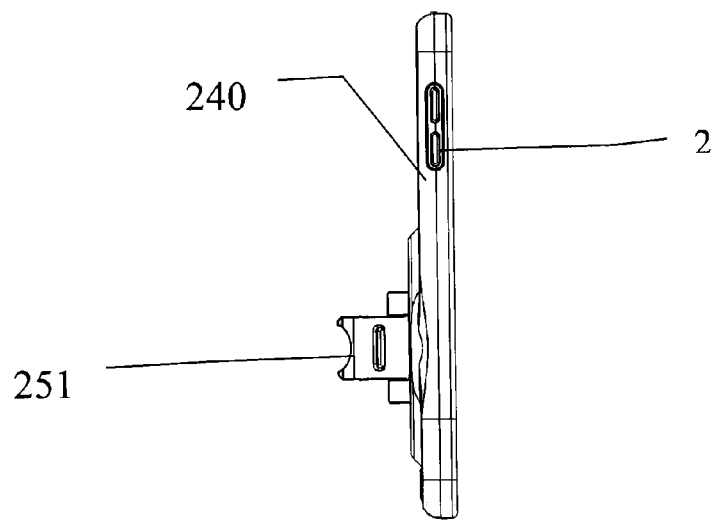
FIG. 5C is a side view of the electronic device holder of FIG. 5A holding the electronic device, where the electronic device holder has a stand thereof in an extended position according to a first rotatable orientation.
Figure 5D:
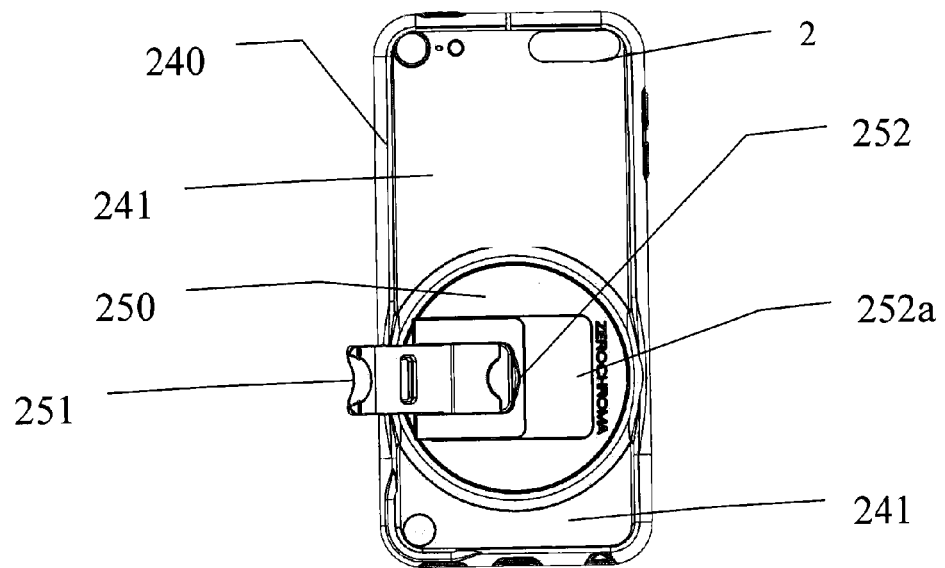
FIG. 5D is a rear view of the electronic device holder of FIG. 5A holding the electronic device, with the stand of the electronic device holder in the extended position according to the first rotatable orientation.
Figure 5E:
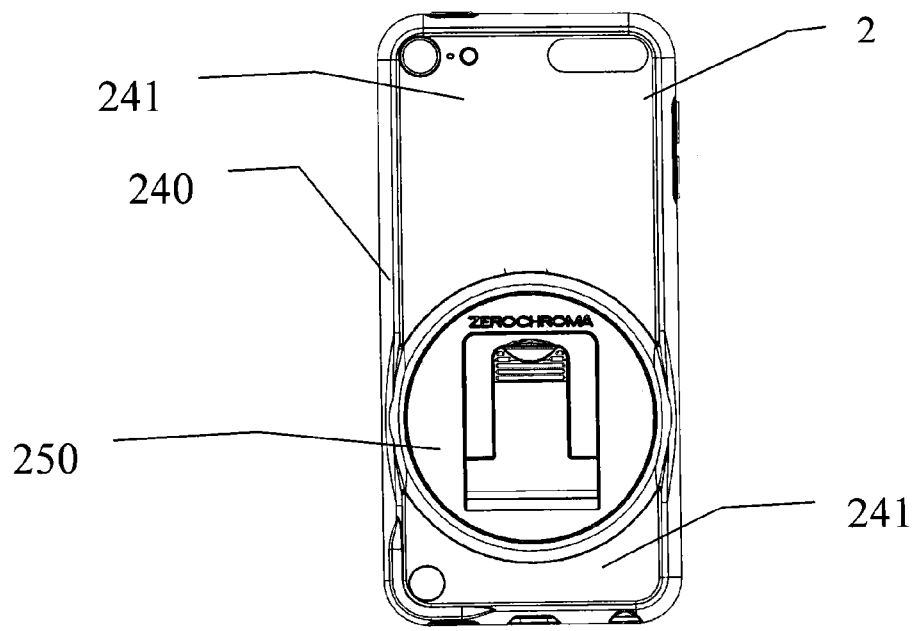
FIG. 5E is a rear view of the electronic device holder of FIG. 5A holding the electronic device, with the stand of the electronic device holder in a fully retracted position according to a second rotatable orientation.
Figure 5F:
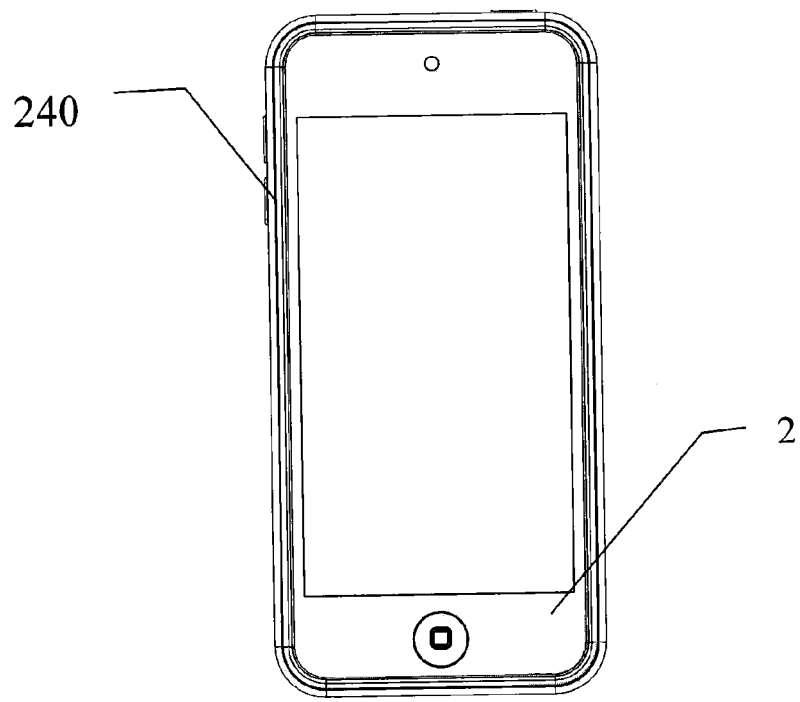
FIG. 5F is a front view of the electronic device holder of FIG. 5A holding the electronic device.
Figure 5G:
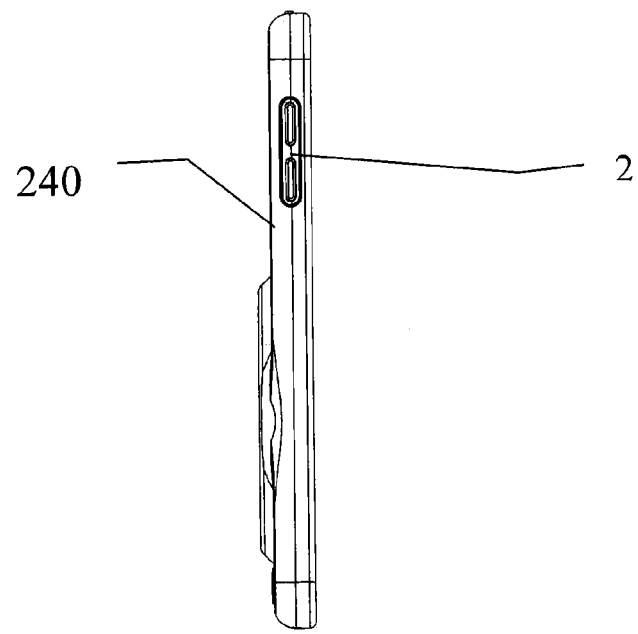
FIGS. 5G and 5H are left and right side views, respectively, of the electronic device holder of FIG. 5A holding the electronic device, with the stand of the electronic device holder in the fully retracted position.
Figure 5H:
Figure 5I:
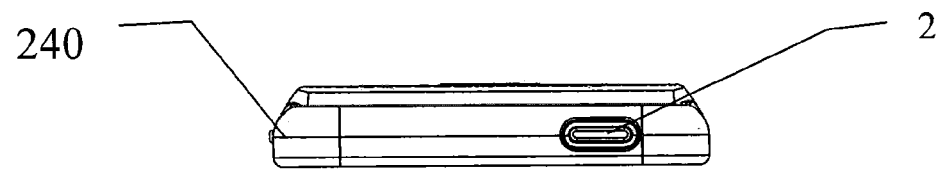
FIGS. 5I and 5J are top and bottom views, respectively, of the electronic device holder of FIG. 5A holding the electronic device, with the stand of the electronic device holder in the fully retracted position.
Figure 5J:
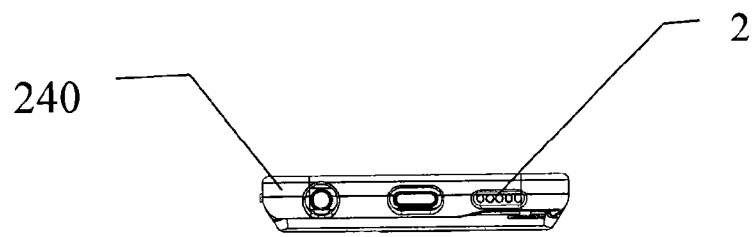
Figure 5K:
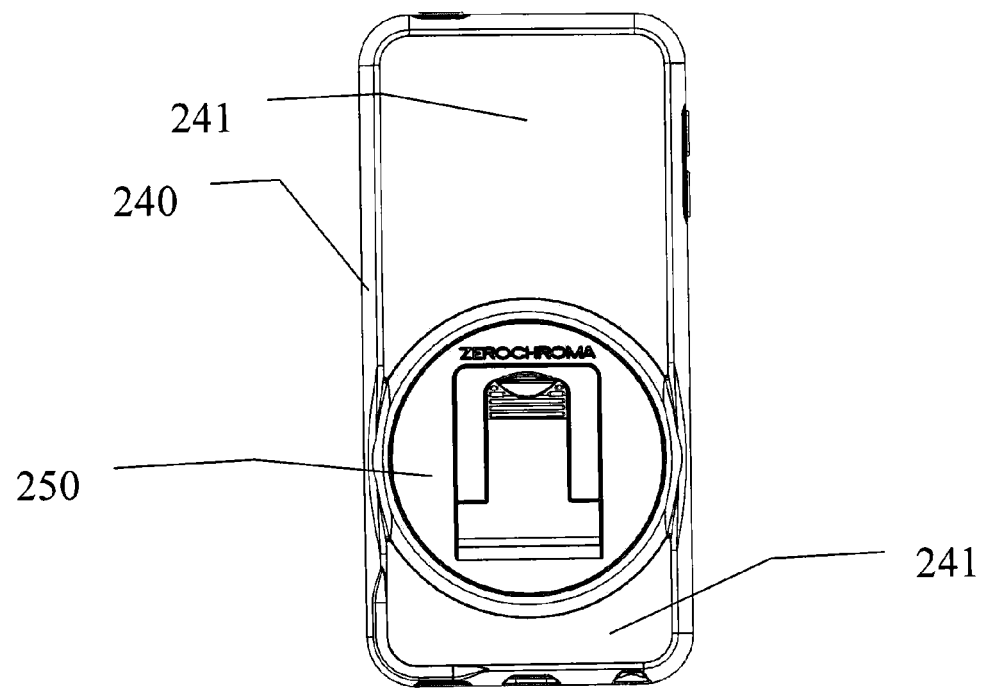
FIG. 5K is a rear side view of the electronic device holder of FIG. 5A without the electronic device, where the stand of the electronic device holder is in the fully retracted position according to the first rotatable orientation.
Figure 5L:
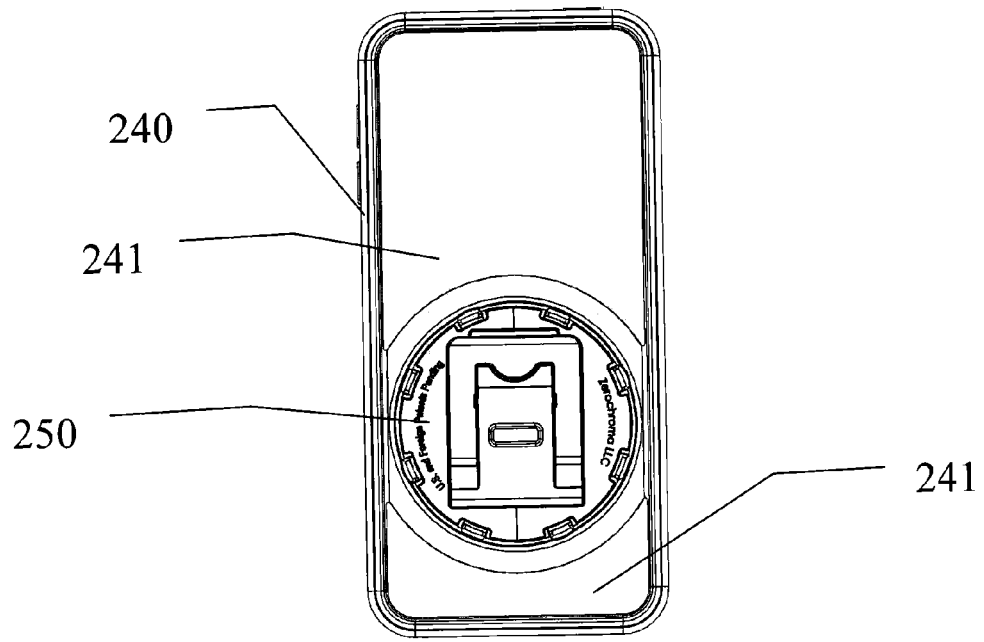
FIG. 5L is a front view of the electronic device holder of FIG. 5A without the electronic device, where the stand of the electronic device holder is in the fully retracted position according to the first rotatable orientation.

FIG. 2 shows a non-limiting example of a support system 200 to support an electronic device 2 according to an embodiment of the present invention.

System 200 includes a mounting apparatus, in this case an arm band or strap 210, which may be elastic or inelastic, and an electronic device holder 240. Incidentally, the mounting apparatus is not limited to an arm band and may be a band for another purpose (e.g., a head band), or some other mounting apparatus, such as a belt clip, a belt, a clip to a handle bar or chassis of a bicycle, a pocket clip, etc.

As shown in FIGS. 2, 3A-3F, and 4A-4C, a mounting apparatus in the form of the arm band 210 includes an end looped around so as to extend through an adjustment mechanism 215. Accordingly, the support member arm band 210 can be provided around a user's arm, for example. The adjustment mechanism 215 can tighten or loosen the band 210 around the user's arm and includes a housing 216 that houses a ratchet mechanism comprised of a ratchet drum 217 having a plurality of locking steps and a locking/release mechanism 218 having a portion 218*a* to engage with the locking steps and thereby directionally lock the drum 217 and a portion 218*b*, for example, a release lever, to release the drum 217 from lock. Thus, the adjustment mechanism 215 is operative as a "ratchet wind" mechanism, where the user can use his or her finger or thumb to rotate the ratchet drum 217 to tighten the band 210. The ratchet wind adjustment mechanism shown in FIGS. 2, 3A-3F, and 4A-4C is merely an example of an adjustment mechanism that may be used and is in no way intended to be limiting as to the types or kinds of adjustment mechanism usable with embodiments of the present invention. For example, ends of the arm band 210 can be configured as hook and loop fasteners. Also, other types or configurations of straps or bands may be employed.

The mounting apparatus in the form of arm band 210 can also include a mounting portion, in this case a clip 220, made out of plastic or molded rubber, for instance. Incidentally, the clip 220 may optionally be configured also as a belt clip or as a pants clip, such that the clip 220 is removable from the arm band 210 and attachable to one or more of a belt or pants. The clip 220 can be attached to the arm band 210 via slots 211, for instance. The electronic device holder 240 is connectable to the arm band 210 via the mounting portion in the form of clip 220 as shown in FIG. 2. From the electronic device holder 240 side, the electronic device holder 240 can be coupled to the clip 220 via a stand 250 thereof.

FIGS. 5A-5E and 5G-5L show an example of an electronic device holder 240 with a stand 250 according to embodiments of the present invention that can be attached to the clip 220 of arm band 210. However, other holders or stands may be attachable to clip 220 (or suitable variations thereof corresponding to the stand or stands to which the clip is to be connectable). Also, generally, electronic device holders and stands according to embodiments of the present invention, such as the holder and stand shown in FIGS. 6A-6E, 6I, 6K, and 7B described infra, may be attachable to a mounting portion of a mounting apparatus 110. Generally speaking, as noted above, a portion or portions of electronic device holders according to embodiments of the present invention may be coupled to corresponding mounting apparatuses, and a portion or portions of the electronic device holder are movable relative to the mounting apparatus, while the coupled portion or portions of the electronic device holder remain stationary, coupled to the mounting apparatus.

Stand 250 can be in an extended position, for example, fully extended, in order to be coupled to clip 220. Further, stand 250 is rotatable about its central axis (i.e., the inner portion of the circle can rotate) and can be in any rotatable orientation in the extended coupling position, such as the landscape orientation shown in FIG. 5D or a portrait orientation wherein the electronic device holder 240 is ninety degrees rotated from the landscape orientation shown in FIG. 5D. Other rotatable orientations for the electronic device holder 240 are also possible, such as orientations non-orthogonal to landscape or portrait orientations. Optionally, in embodiments of the present invention, stand 250 may not be able to pivot outwardly or inwardly when coupled to clip 220. That is, stand 250 may only be adjustable via rotation and not by movement of the stand 250 to toward or away from its retracted or extended positions. Incidentally, as used herein the term position can mean fixed or "holdable" positions of the stand 250 to hold or support the stand 250 so that it can support the device in one or more corresponding viewing angles or orientations.

Stand 250 can have a first portion 251 configured to mate with a corresponding first portion 221 of clip 220, which may be a cut out portion sized to accommodate first portion 251, and a second portion 252 configured to mate with a corresponding second portion 222 of clip 220. Internal to second portion 222 can be a biasing mechanism, such as a spring (not shown). The biasing mechanism can act on second portion 222 such that a boss 222*a* of the second portion 222 is biased in a slot and undercut portion 252*a* of the stand 250, which is exposed when the stand 250 is in the extended coupling position, to fixedly attach the stand 250 (and thus electronic device holder 240) to clip 220 (and thus arm band 210). To release the electronic device holder 240 from the clip 220, the user can press release portion 222*b* of the second portion 222 toward boss 222*a* to release boss 222*a* from the slot and undercut portion 252*a* of the second portion 252 for disengagement of stand 250 from clip 220.

Regarding electronic device holder 240 shown in FIGS. 2 and 5A-5L, generally, unconnected to clip 222, electronic device holder 240, by way of stand 250, can allow placement of the electronic device holder 240 on a surface for hands-free viewing of a corresponding electronic device coupled to a front face or side thereof, and with adjustment of viewing angle in both landscape and portrait orientations. Of course other orientations are possible. Further, a viewing angle of the electronic device holder 240 may be adjusted based on the state of the stand 250, that is, in what position relative to fully extended, fully retracted, or somewhere in between the first portion 251 is in. In one or more embodiments, one or more of the rotational and extended/retracted positions of the stand 250 may be preset or predefined. Alternatively, the positions may not be defined and the stand 250 and first portion 251 thereof may be moved to any position from a starting point to an ending point of movement.

As shown in FIGS. 2 and 5A-5L, portions 241 associated with a backside of electronic device holder 240 may optionally be clear or cut away (i.e., removed). In this way, back side portions of the electronic device 2 are viewable in both cases, and in the case of cut away portions, removal of the material for portions 241 reduces the weight of the electronic device holder 240 as compared to an electronic device holder 240 where such portions are not cut away. Further, electronic device holders according to one or more embodiments of the present invention may have one or more of the above-discussed cut away or clear portions, but with a different stand configuration (e.g., a square, oval, or some other plan view shape other than the generally circular configuration shown in FIGS. 2 and 5A-5L) or with no stand configuration at all. That is, the non-cut away or non-clear portions may have some other configuration or purpose other than as a stand, such as an attachment mechanism, rather than a stand, for attachment to either a mounting apparatus and an object. As will be discussed in more detail below, holder 340 in FIG. 6A, for example, may optionally include one or more clear or cut away portions.

FIGS. 6A-6L and 7A-7B show an electronic device holder 340 according to another embodiment of the present invention.

Electronic device holder 340 includes a flexible stand 350. The flexible stand 350 can be removably attached to the electronic device holder 340, as shown in FIGS. 6E and 6F. Flexible stand 350 may be attached to electronic device holder 340 by insertion of a free end 352 from a front side 341 of electronic device holder (and without an electronic device being held or encased in the holder) through hole 342, and such that base end 351 of flexible stand 350 is fixedly attached in place in the through hole 342, for example, by snap fit or friction fit.

Flexible stand 350 can be relatively thicker than electronic device holder 340. As such, electronic device holder 340 can have a raised portion 345 surrounding the flexible stand. A portion of the free end 352 may project from the raised portion 345 so that a user is able to remove the free end 352 for positioning thereof to a standing support surface or as an attachment mechanism to one or both of an object and a mounting apparatus. Alternatively, in an embodiment where the electronic device holder is of a same or similar thickness as the flexible stand, a raised portion may not be provided, as the flexible stand 350 can be embedded in the body of the electronic device holder.

The flexible stand 350 can be made of a different material than the material of the electronic device holder 340. For example, the flexible stand 350 can be made out of rubber and can have embedded therein a metal wire or wires, whereas the electronic device holder 340 can be made of a rigid plastic. The free end 352 of flexible stand 350 can be bent or arranged in a plurality of directions, as noted above, for contact with a standing support surface or for coupling to either an object or a mounting apparatus. For example, FIG. 6D shows a portion of flexible stand 350 removed from raised portion 345 being arranged (i.e., bent) to provide a stand for portrait orientation of the electronic device holder 340. Not expressly shown in the figures, the portion of the flexible stand 350 may also be bent towards either of the long sides of the electronic device holder 340 to provide a stand for landscape orientation of the electronic device holder 340. Also, flexible stand 350 can be rotated or twisted about its axis to move the rotate or twist the electronic device holder 340. For example, in a situation where the flexible stand 350 is coupled to a mounting apparatus, the flexible stand 350 may have a portion thereof twisted, rotated, or bent to move the electronic device holder 340 in corresponding movement with respect to the mounting apparatus.

Flexible stands according to embodiments of the present invention are not limited to the specific example shown in FIGS. 6A-6E, 6I, 6K, and 7B and may have a free end in the form of a plurality of flexible rings arranged end-to-end or a trident or two-pronged (i.e., multiple free end portions) free end, where some or all of the end portions may be recessed in the body of the body or raised portion of the electronic device holder.

Electronic device holder 340 can also include an adapter 360 that is removably coupled to electronic device holder 340. The adaptor 360 may be removably coupled to the electronic device holder 340 via friction fit or snap fit, for example, via clip portions 365 and corresponding receiving portions of the electronic device holder 340. Adaptor 360 can be configured to be coupled to the electronic device holder 340 on a first side thereof and to another component on a second side thereof, such as a cover 370 or a keyboard connection portion. Alternatively, in one or more embodiments of the present invention, an adaptor removably coupled to the electronic device holder 340 can be configured to replicate a portion of the electronic device holder 340 that would normally exist if not for the adaptor. That is, the adaptor can replicate a "normal" side of the electronic device holder 340. Incidentally, though not shown in FIGS. 6A-6L and 7A-7B, one or more embodiments of the present invention include an electronic device holder with an adaptor 360, but without a stand, such as flexible stand 350. Thus, electronic device holder 340 can be used with multiple configurations, depending upon the configuration of the adaptor 360 and to what the adaptor 360 is connected in cases where the adaptor does not replicate the "normal" portion of the electronic holder 340.

Cover 370 may be fixedly or removably coupled to adaptor 360. FIG. 6I shows an example where cover 370 is removably coupled to adaptor 360 and FIGS. 6J-6L show an example where cover 370 is fixedly coupled to adaptor 360.

Figure 6A:
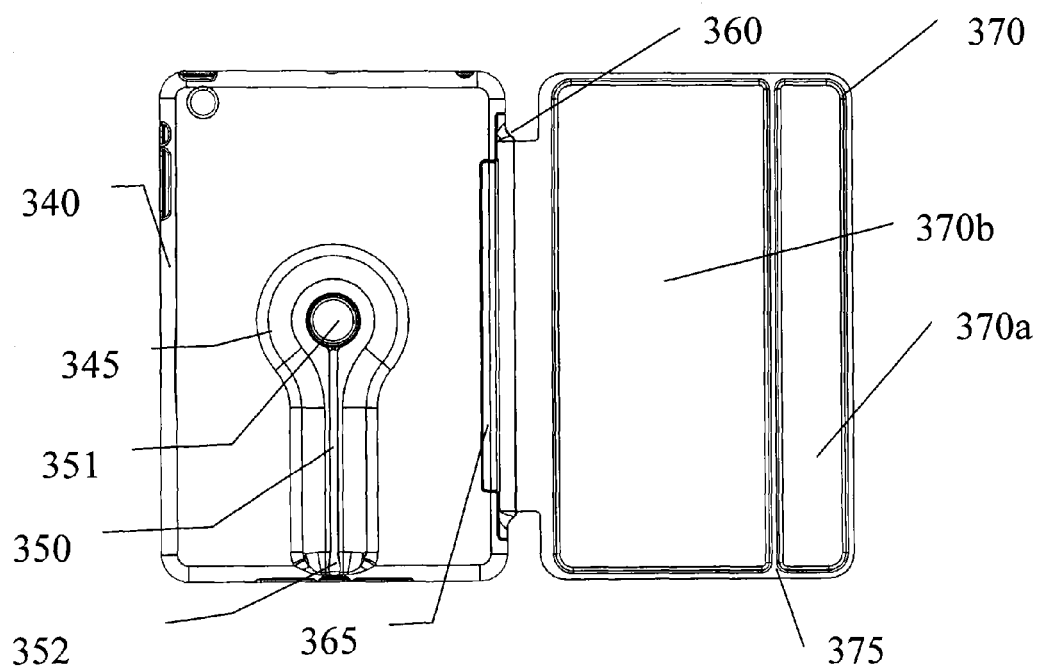
FIG. 6A is a rear view of an electronic device holder with a cover in an open position according to an embodiment of the present invention.
Figure 6B:
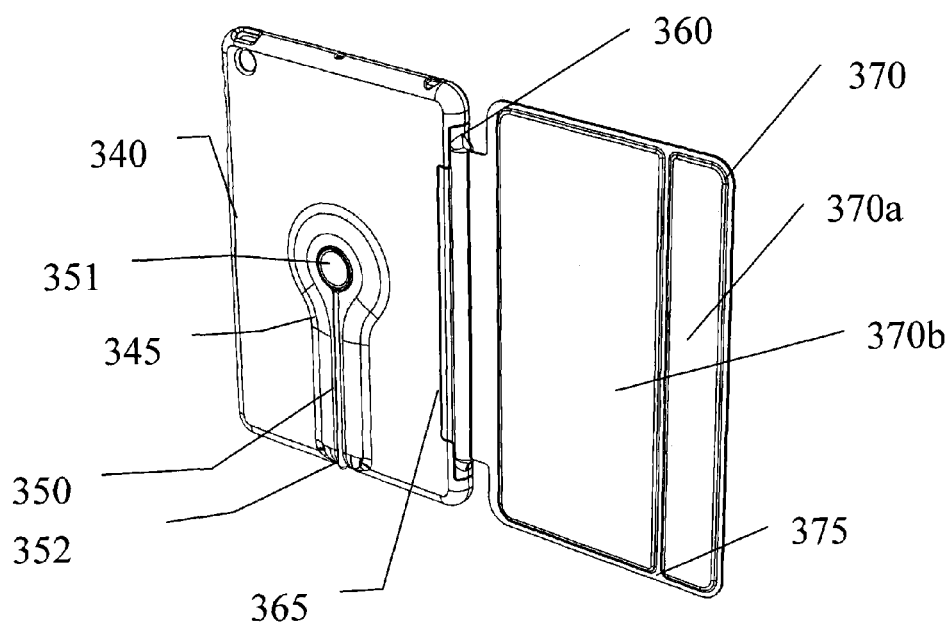
FIG. 6B is a rear perspective view of the electronic device holder and cover of FIG. 6A.
Figure 6C:
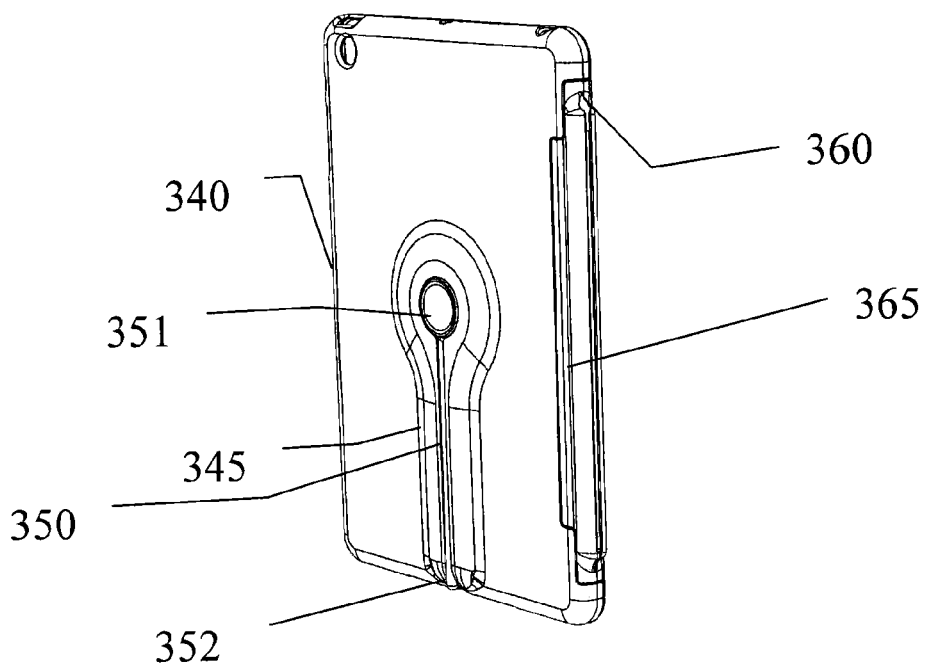
FIG. 6C is a side rear perspective view of the electronic device holder of FIG. 6A with the cover in a fully closed position.
Figure 6D:
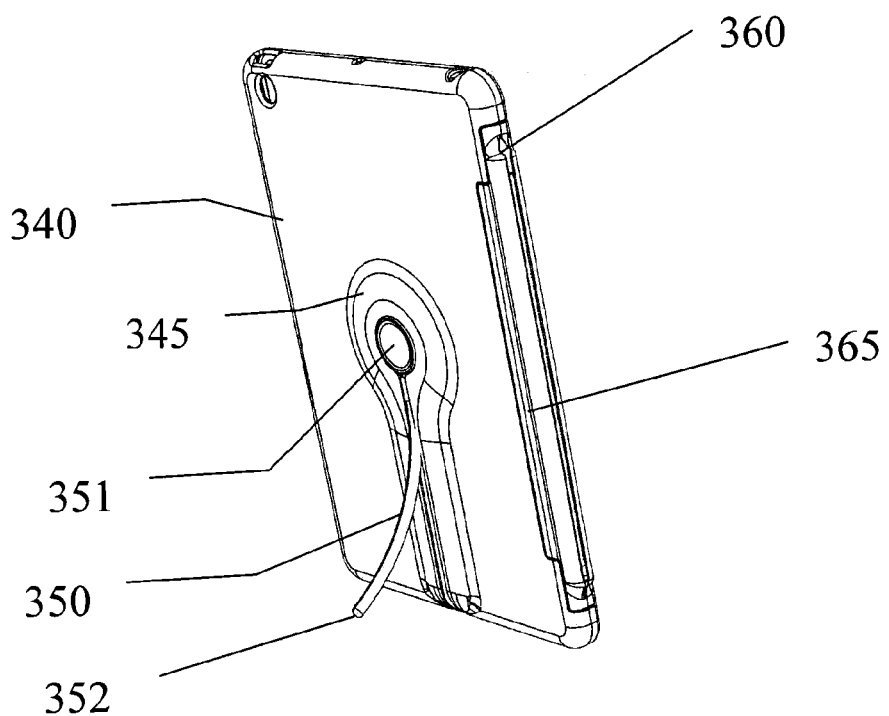
FIG. 6D is a side rear perspective view of the electronic device holder of FIG. 6A with the cover in the fully closed position and with a stand in an extended position.
Figure 6E:
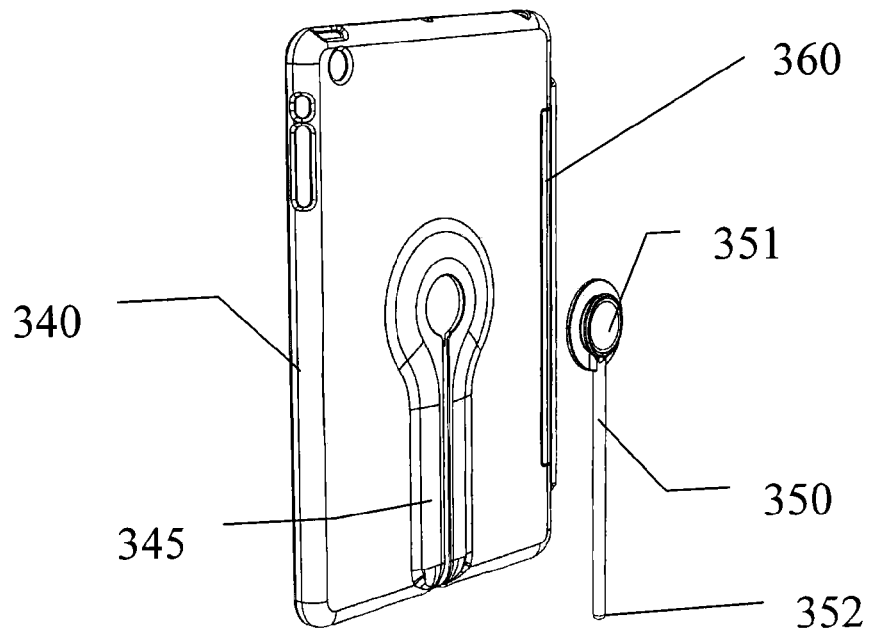
FIG. 6E is a side rear perspective view of the electronic device holder of FIG. 6A with the cover removed and with the stand detached.
Figure 6F:
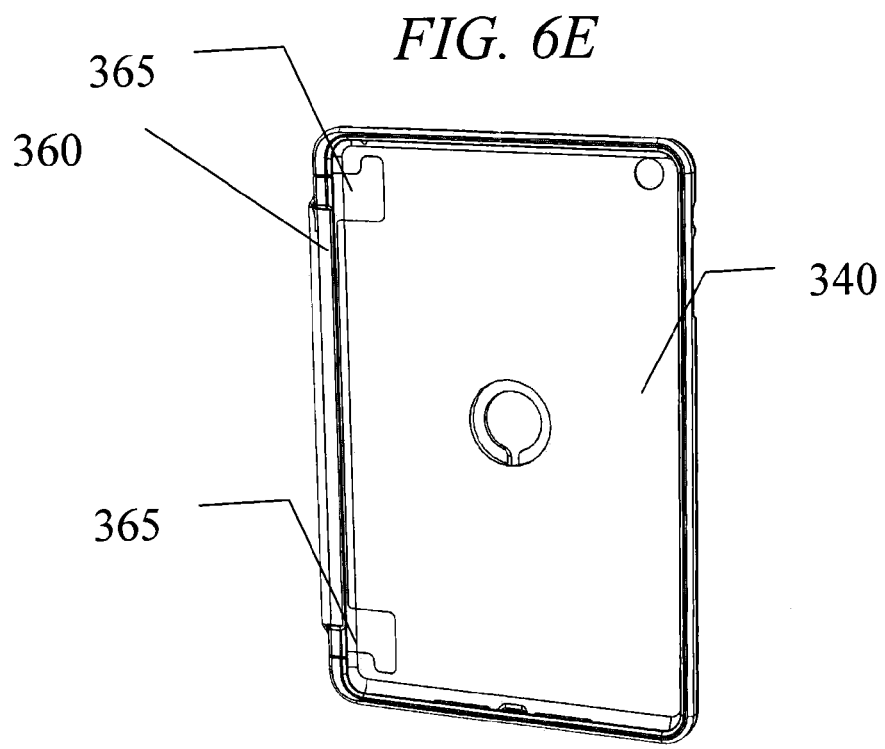
FIG. 6F is a front perspective view of the electronic device holder of FIG. 6A without the cover and the stand.
Figure 6G:
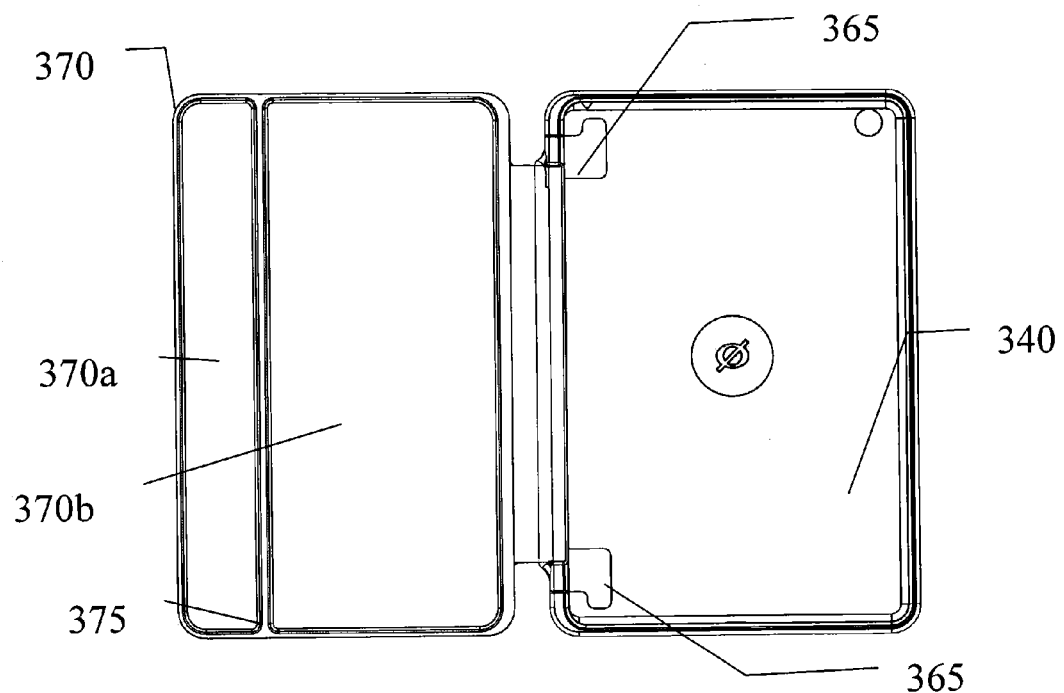
FIG. 6G is a front view of the electronic device holder of FIG. 6A with the cover in the open position.
Figure 6H:
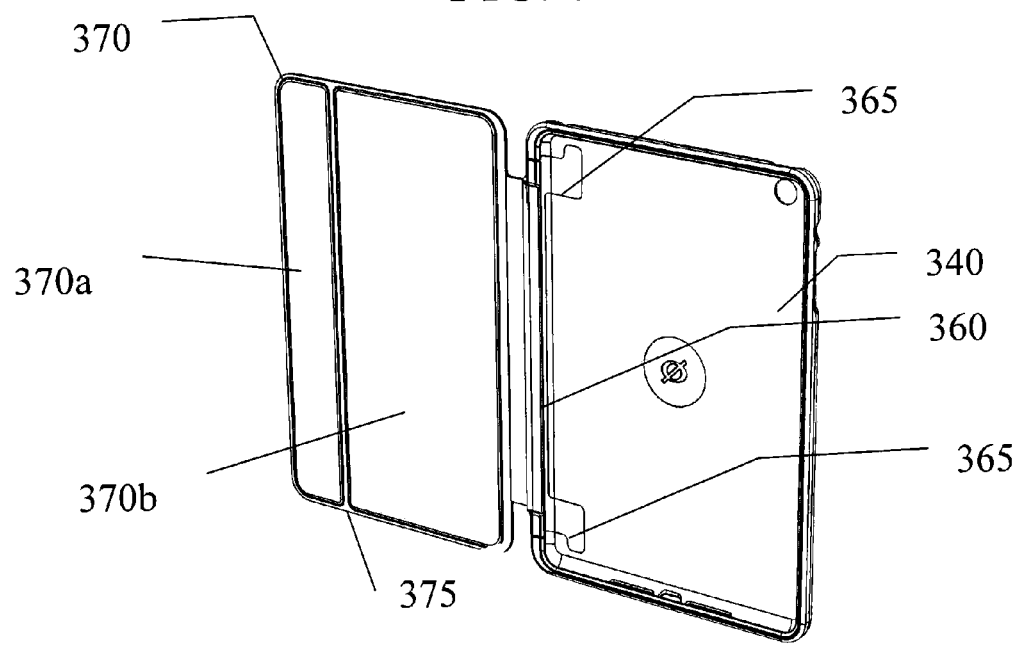
FIG. 6H is a front perspective view of the electronic device holder of FIG. 6A with the cover in the open position.
Figure 6I:
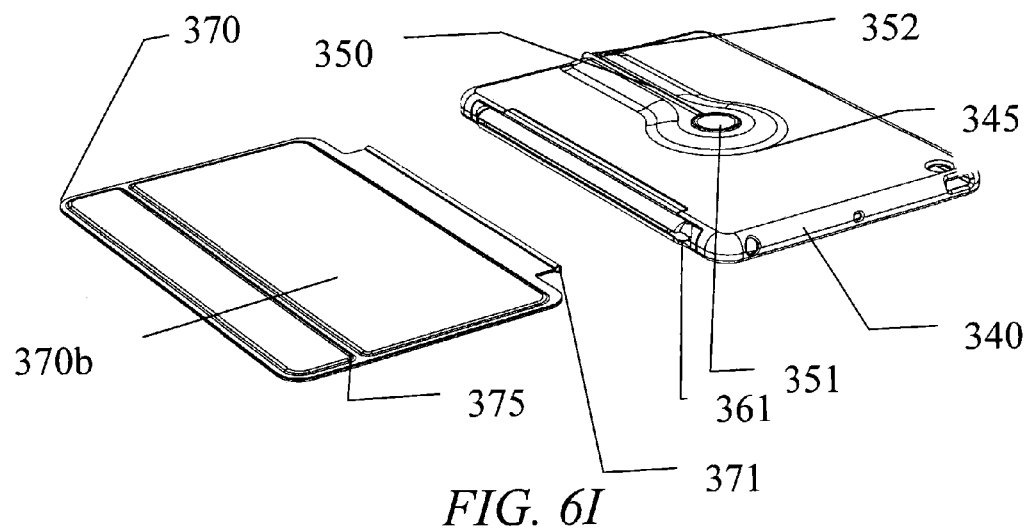
FIG. 6I is a rear perspective view of the electronic device holder of FIG. 6A showing the cover detached from the holder.
Figure 6J:
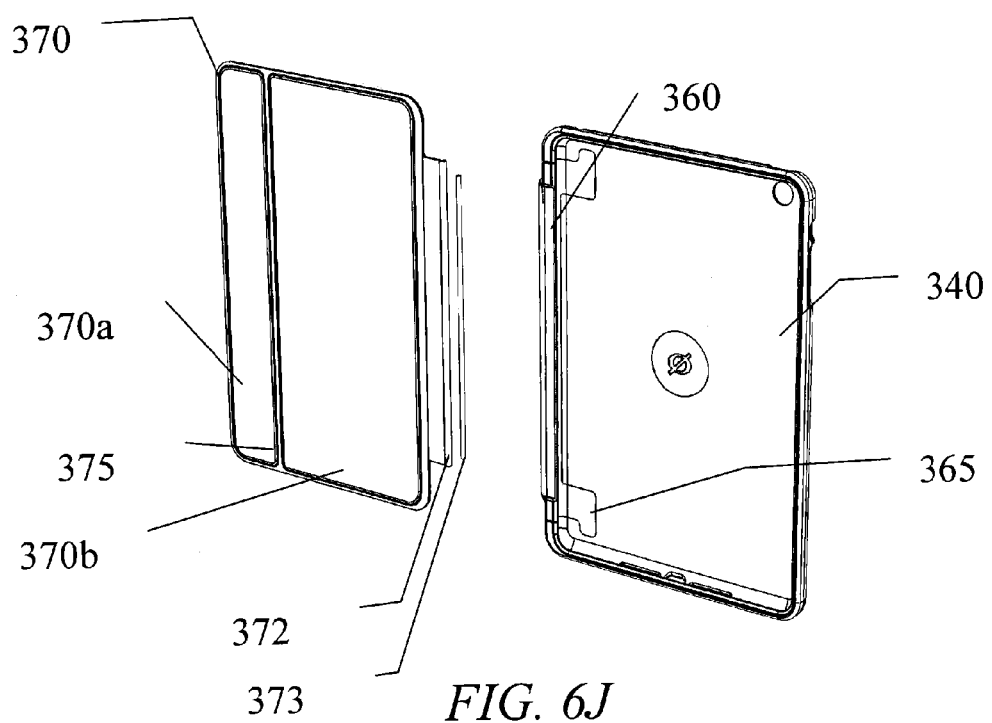
FIG. 6J is a front perspective exploded view of the electronic device holder of FIG. 6A showing the cover detached from the holder.
Figure 6K:
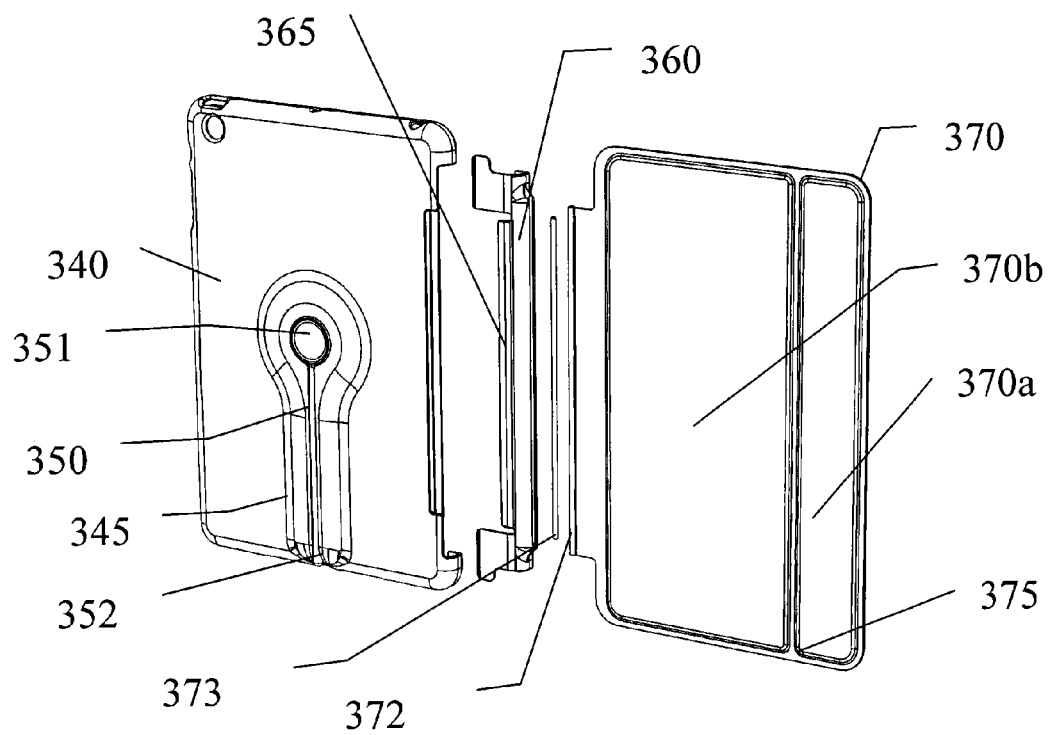
FIG. 6K is a rear exploded view of the electronic device holder of FIG. 6A.
Figure 6L:
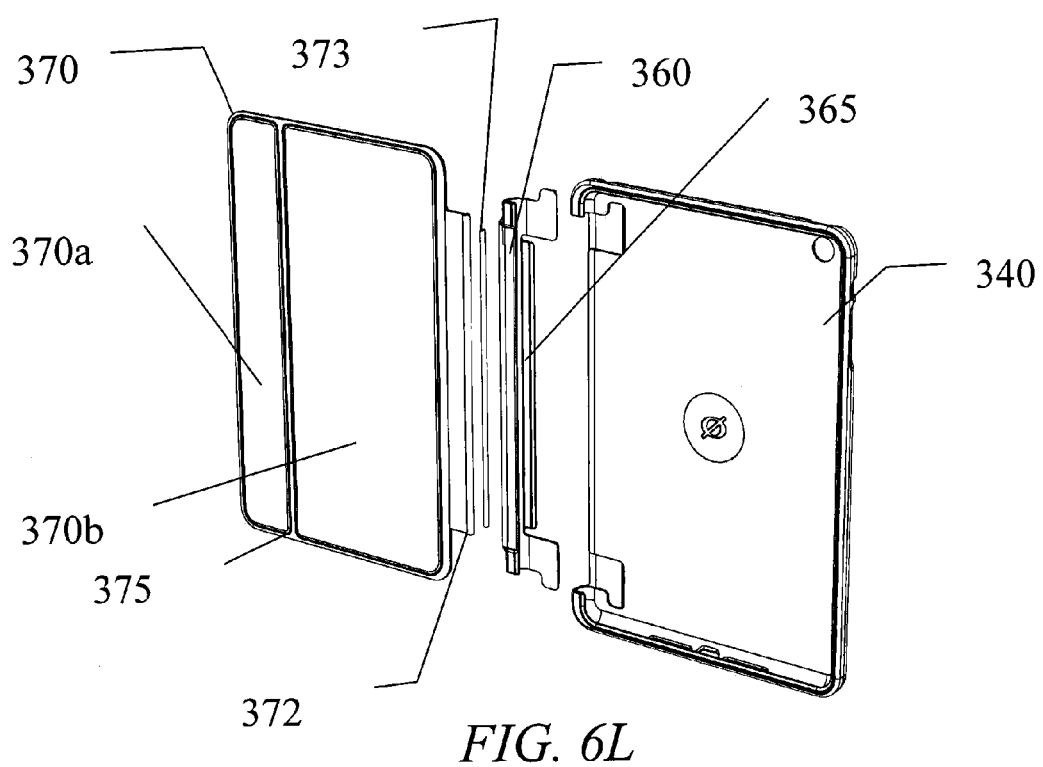
FIG. 6L is a rear exploded view of the electronic device holder of FIG. 6A.
Figure 7A:
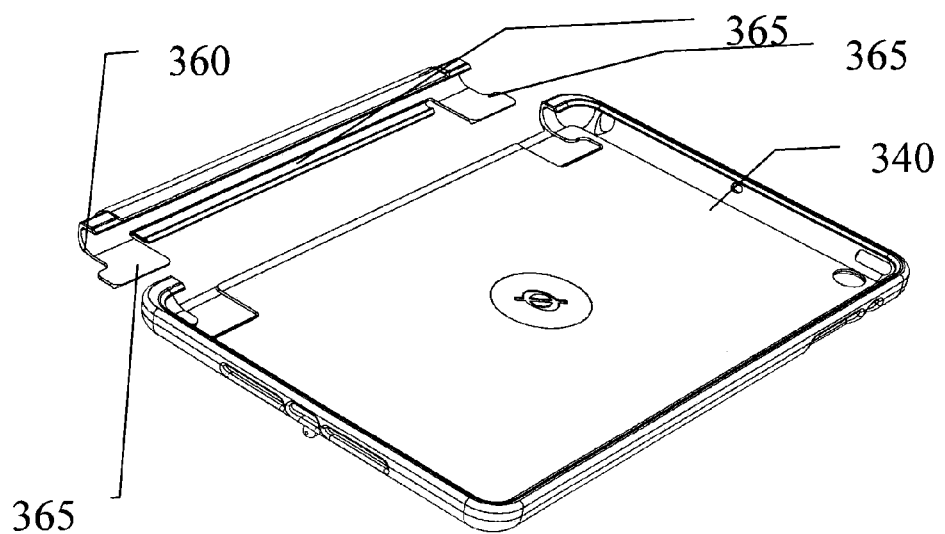
FIG. 7A is a front perspective view of the electronic device holder of FIG. 6A showing a removable adaptor thereof.
Figure 7B:
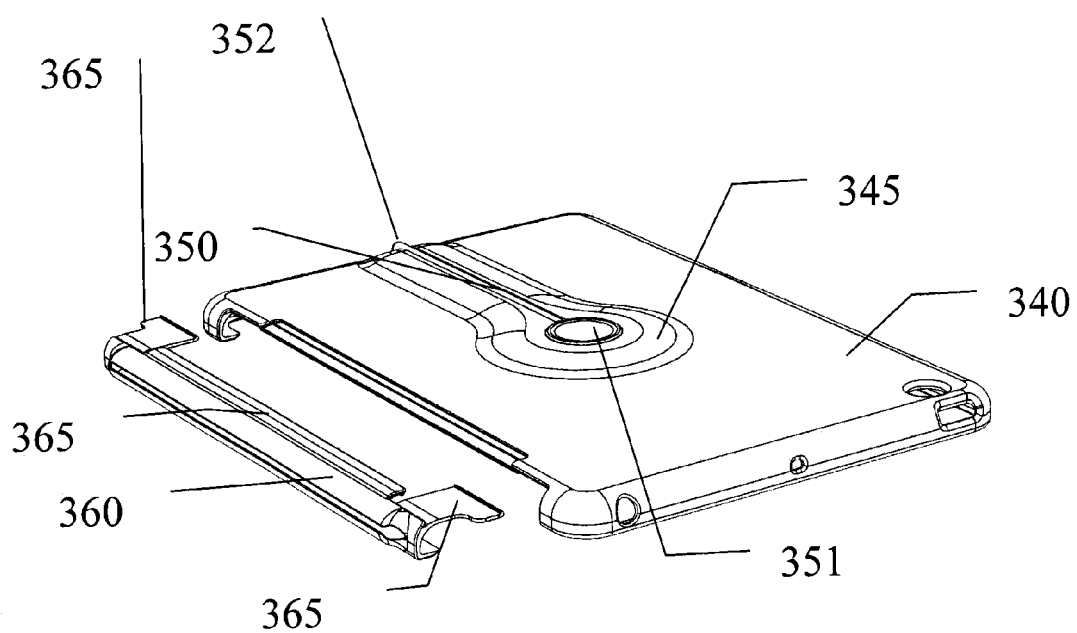
FIG. 7B is a rear perspective view of the electronic device holder of FIG. 6A showing the removable adaptor.

As shown by FIGS. 6C, 6D, and 6I, coupled adaptor 360 includes a slot 361, and cover 370 includes a corresponding rod portion 371, for example, formed in one piece with the cover 370, and insertable into the slot 361 (e.g., by sliding) to form a hinge for the cover 370. Thus, the cover 370 may be inserted and removed from the adaptor 360 via slot 361. The hinge provides a pivot so the cover 370 may be rotated to cover and uncover a front portion of an electronic device, such as a display portion or control panel portion of the electronic device. As shown in FIGS. 6J-6L, coupled adaptor 360 includes a receiving portion to receive hollow rod portion 372, and a pin 373 is inserted in the receiving portion and the hollow rod portion 372 to fixedly couple the cover 370 to the adaptor 360 and to form a hinge for the cover 370.

In one or more embodiments of the present invention, cover 370 can include a foldable portion 375 so a first cover portion 370a can be folded relative to a second cover portion 370b. The folding of the first cover portion 370a relative to the second cover portion 370b, together with the pivoting of the cover 370 via the hinge, can provide a stand for orienting the electronic device holder 340 in landscape view, for instance.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

The invention claimed is:

1. A system to support an electronic device, comprising:
an electronic device holder to hold the electronic device; and
a movable stand arranged on a back side of said electronic device holder, said movable stand being configured to be releasably coupled to a mount, coupleable and decouplable, without disassembly of any portion of either the mount, the movable stand, or the electronic device holder, and movable to at least two different holdable positions, one of the at least two different holdable positions being outward from said electronic device holder and to support said electronic device holder in a corresponding viewing angle,
wherein said movable stand is configured to allow movement of said electronic device holder relative to the mount when said movable stand is releasably coupled to the mount to change at least one of a viewing angle and a viewing orientation of said electronic device holder,
wherein said movable stand is configured to be between said electronic device holder and the mount, and
wherein the movable stand is fully operational when not coupled to the mount.

2. The system according to claim 1, wherein said movable stand is immovable when releasably coupled to the mount.

3. The system according to claim 1, further comprising an adaptor removably coupleable to said electronic device holder.

4. The system according to claim 3, wherein said adaptor is configured to be removably coupleable only to said electronic device holder.

5. The system according to claim 3, wherein said adaptor is configured to be removably coupleable to said electronic device holder and coupleable to a cover to cover a front side of said electronic device holder.

6. The system according to claim 3, further comprising said mount, said mount being different than said adaptor.

7. The system according to claim 1, wherein the at least two positions are predefined in terms in relation to movement of said movable stand.

8. The system according to claim 7, wherein a first predefined position is based on rotational movement about a central axis of said movable stand.

9. The system according to claim 8, wherein the first predefined position for said movable stand provides for said movable stand to be in at least landscape and portrait orientations.

10. The system according to claim 1,
wherein the at least two positions are undefined, and
wherein said movable stand is removably coupled to said electronic device holder.

11. The system according to claim 10, wherein the undefined movement for said movable stand provides for said movable stand to be in at least landscape and portrait orientations.

12. The system according to claim 1, wherein said movable stand is configured to be releasably coupled to the mount in one of only in a fully open position of a support leg of said moveable stand and an open or extended position of the support leg.

13. The system according to claim 1, wherein the movable stand is configured to rotate about a central axis thereof, the central axis always being perpendicular to a plane of a receiving face of the electronic device holder for all positions of the movable stand.

14. An electronic device holder to hold an electronic device, comprising:
a body including a back side and a front side having a coupling mechanism to receive and hold at least a first portion of the electronic device; and
an adaptor at a side portion of said body, said adaptor having an edge-based coupling mechanism adapted to be configured to receive and removably hold, individually, each of a plurality of different mounts and a cover.

15. The electronic device holder according to claim 14, wherein said adaptor is configured to be removably coupleable only to said body.

16. The electronic device holder according to claim 14, further comprising said cover, wherein said adaptor is configured to be coupled to said cover such that said cover is rotatable about a hinge at the coupling so as to be rotatable to cover the front side of said body.

17. The electronic device holder according to claim 16,
wherein the side portion of said body is a top side portion of said body, and
wherein said adaptor is removably coupled to said cover.

18. The electronic device holder according to claim 16, wherein said adaptor is fixedly coupled to said cover.

19. The electronic device holder according to claim 14, further comprising a movable stand formed on the back side of said body.

20. The electronic device holder according to claim 19, wherein the back side of said body includes at least one portion adjacent to said movable stand that is either clear or removed.

21. The electronic device holder according to claim 19, wherein said movable stand is configured to be releasably coupled to a mounting apparatus.

22. The electronic device holder according to claim 14, wherein the adaptor is removably coupled at the side portion of said body and covers a second portion of the electronic device.

23. The electronic device holder according to claim 14, wherein each of the different mounts and cover is slide coupleable to and slide decouplable from the adaptor.

* * * * *